US010524272B2

(12) United States Patent
Silverman et al.

(10) Patent No.: US 10,524,272 B2
(45) Date of Patent: Dec. 31, 2019

(54) RESOURCE ALLOCATION FOR OFDMA WITH PRESERVATION OF WIRELESS LOCATION ACCURACY

(71) Applicant: Cisco Technology, Inc., San Jose, CA (US)

(72) Inventors: Matt Silverman, Shaker Heights, OH (US); Zhigang Gao, Twinsburg, OH (US); Oscar Bejarano Chavez, Cleveland, OH (US); John Matthew Swartz, Lithia, FL (US); Santosh Ghanshyam Pandey, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/865,877

(22) Filed: Jan. 9, 2018

(65) Prior Publication Data

US 2019/0215842 A1 Jul. 11, 2019

(51) Int. Cl.
*H04W 24/10* (2009.01)
*H04W 72/08* (2009.01)
(Continued)

(52) U.S. Cl.
CPC ........ *H04W 72/085* (2013.01); *H04B 7/0626* (2013.01); *H04W 24/10* (2013.01); *H04W 48/17* (2013.01)

(58) Field of Classification Search
CPC ... H04W 72/085; H04W 24/10; H04W 48/17; H04B 7/0626
(Continued)

(56) References Cited

U.S. PATENT DOCUMENTS 8,009,580 B2 * 8/2011 Tao ................. H04L 5/0007
370/252
8,693,386 B2 * 4/2014 Xiao ................ H04B 1/3822
370/315

(Continued)

OTHER PUBLICATIONS

Ahn, et al., "An Energy Efficient Multi-User Uplink Transmission Scheme in the Next Generation WLAN for Internet of Things", International Journal of Distributed Sensor Networks, vol. 12, Issue 7, Jul. 2016, SAGE Publications Ltd.

(Continued)

*Primary Examiner* — Julio R Perez
(74) *Attorney, Agent, or Firm* — Behmke Innovation Group LLC; James Behmke; Stephen D. LeBarron

(57) ABSTRACT

In one embodiment, a control device associated with a wireless network of a given location determines a reference quality of location readings between access points and client devices based on using substantially all of an available wireless communication bandwidth. The control device may then determine channel state information (CSI) between the client devices and access points for each orthogonal frequency-division multiple access (OFDMA) resource unit (RU), and selects a subset of RUs for allocation to each respective client device, based on the subset of RUs allocated to each respective client device i) surpassing a determined threshold of certain parameters of the CSI, while also ii) providing a minimum quality of a location reading based on using only the subset of RUs as compared to the reference quality of location readings. The control device may then allocate the selected subset of RUs to each respective client device for location-preserving OFDMA-signaling-based communication.

20 Claims, 5 Drawing Sheets

(51) Int. Cl.
*H04W 48/00* (2009.01)
*H04B 7/06* (2006.01)

(58) Field of Classification Search
USPC ..................................................... 455/452.2
See application file for complete search history.

(56) References Cited

U.S. PATENT DOCUMENTS

| | | |
|---|---|---|
| 9,131,430 B2 | 9/2015 | Kwon et al. |
| 9,363,703 B2* | 6/2016 | Lan .................. H04W 28/0257 |
| 9,722,744 B2* | 8/2017 | Siomina ................. A61K 38/39 |
| 2008/0050712 A1* | 2/2008 | Madani .................... G09B 7/02 434/350 |
| 2011/0003608 A1 | 1/2011 | Forenza et al. |
| 2016/0105836 A1 | 4/2016 | Seok |
| 2017/0126453 A1 | 5/2017 | Montreuil et al. |
| 2017/0339680 A1* | 11/2017 | Jia ........................ H04W 28/02 |

OTHER PUBLICATIONS

Guéguen, et al., "Comparison Study of Resource Allocation Strategies for OFDM Multimedia Networks", Journal of Electrical and Computer Engineering, vol. 2012, Article ID 781520, 2012, 11 pages, Hindawi Publishing Corporation.

Ksairi, et al., "Optimal Resource Allocation for Type-II HARQ Based OFDMA Ad Hoc Networks under Individual Rate and PER Constraints", 2014 IEEE 79th Vehicular Technology Conference (VTC Spring), 2014, 5 pages, IEEE.

"Winnow (algorithm)", https://en.wikipedia.org/wiki/Winnow_(algorithm), Aug. 24, 2017, 1 page, Wikimedia Foundation, Inc.

* cited by examiner

RESOURCE ALLOCATION FOR OFDMA WITH PRESERVATION OF WIRELESS LOCATION ACCURACY

TECHNICAL FIELD

The present disclosure relates generally to computer networks, and, more particularly, to resource allocation for orthogonal frequency-division multiple access (OFDMA) with preservation of wireless location accuracy.

BACKGROUND

IEEE 802.11ax is a type of wireless local area network (WLAN) in the IEEE 802.11 set of types of WLANs. It is designed to improve overall spectral efficiency, especially in dense deployment scenarios. In particular, in addition to utilizing multiple-input and multiple-output (MIMO) and multi-user MIMO (MU-MIMO), 802.11ax introduces orthogonal frequency-division multiple access (OFDMA) to improve overall spectral efficiency, and higher order quadrature amplitude modulation (QAM) support (such as 1024-QAM) for increased throughput, specifically due to more efficient spectrum utilization.

Using 802.11ax, however, can be problematic for locationing services (that is, technology that allows for the pinpointing of a wireless client device's location within a given space based on wireless signals). In particular, the division of bandwidth for OFDMA resource unit allocation can detrimentally affect location accuracy because narrow bandwidths are more susceptible to variations in the frequency selective channel than the entire bandwidth. Unfortunately, selecting more resource units is not optimal as it reduces the capacity of the network, countering the benefits of OFDMA in the first place.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
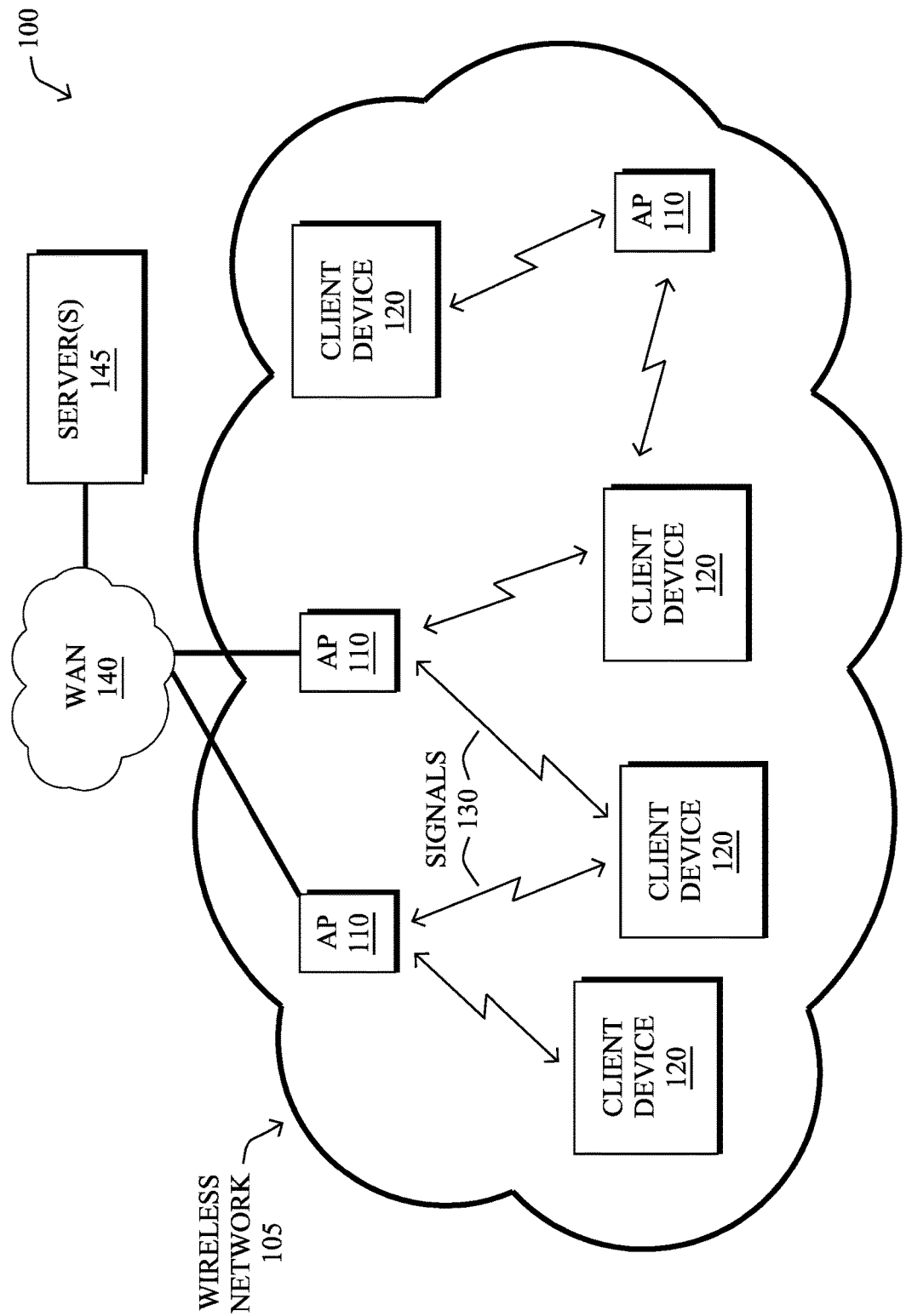
FIG. 1 illustrates an example computer network.

According to one or more embodiments of the disclosure, a control device associated with a wireless network of a given location divides an available wireless communication bandwidth into a plurality of resource units (RUs) based on orthogonal frequency-division multiple access (OFDMA) signaling. The control device also determines a reference quality of location readings between one or more access points of the wireless network and each of a plurality of client devices within the wireless network based on using substantially all of the available wireless communication bandwidth. In accordance with the techniques herein, the control device may then determine channel state information (CSI) between each of the plurality of client devices and the one or more access points of the wireless network for each of the plurality of RUs, and selects a subset of RUs of the plurality of RUs for allocation to each respective client device of the plurality of client devices, the selecting based on the subset of RUs allocated to each respective client device i) surpassing a determined threshold of one or more parameters of the CSI, while also ii) providing a minimum quality of a location reading based on using only the subset of RUs as compared to the reference quality of location readings for the respective client device. The control device may then allocate the selected subset of RUs of the plurality of RUs to each respective client device of the plurality of client devices for OFDMA-signaling-based communication between the one or more access points of the wireless network and the plurality of client devices.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

One specific type of computer network is a wireless network (or wireless LAN/WLAN), where one or more wireless access points (APs) provide wireless network connectivity to client devices (e.g., sensor devices, user devices, mobile devices, etc.). The wireless network may be private and disconnected from any other network, or else the APs may be further connected to a LAN or further a WAN. The IEEE 802.11 Working Group for Wireless standards is one example entity that puts forth standardized communication protocols for use in wireless networking, though others exist as well.

FIG. 1 is a schematic block diagram of an example simplified computer network 100 illustratively comprising a wireless network 105 having one or more APs 110 providing connectivity to any number of client nodes/devices 120, which may be stationary or mobile within the space, and may freely leave and enter the space. For example, one or more stationary sensor devices (e.g., cameras, motion sensors, temperature sensors, etc.) may be stationary client devices 120, while one or more laptops (client devices 120) may be located within a wireless area space for extended periods of time, but not permanently. Also, other client devices 120, such as user smartphones, may enter the area, move throughout the area, and leave the area, in comparatively short amounts of time. Wireless communication signals 130 (e.g., radio signals, optical signals, etc.) may commence between the client devices 120 and APs 110 according to various protocols (at any network layer, as may be understood by those skilled in the art).

Computer network 100 may also comprise a connection from the APs 110 through a router 130 or other network/backbone device (e.g., modem, firewall, switch, etc.) to a WAN 140 and/or different types of local networks located in different geographical areas (e.g., the Internet, cloud, enterprise networks, etc.). For example, wireless network 105 may comprise local/branch networks that include client devices/nodes 120 communicating through APs to a data center/cloud environment (WAN 140) that includes one or more servers 145. Servers 145 may include, in various embodiments, a network management server (NMS), a dynamic host configuration protocol (DHCP) server, a constrained application protocol (CoAP) server, an application policy infrastructure controller (APIC), an application server, web server, etc. As would be appreciated, network 100 may include any number of local networks, data centers, cloud environments, devices/nodes, APs, servers, etc.

Figure 2:
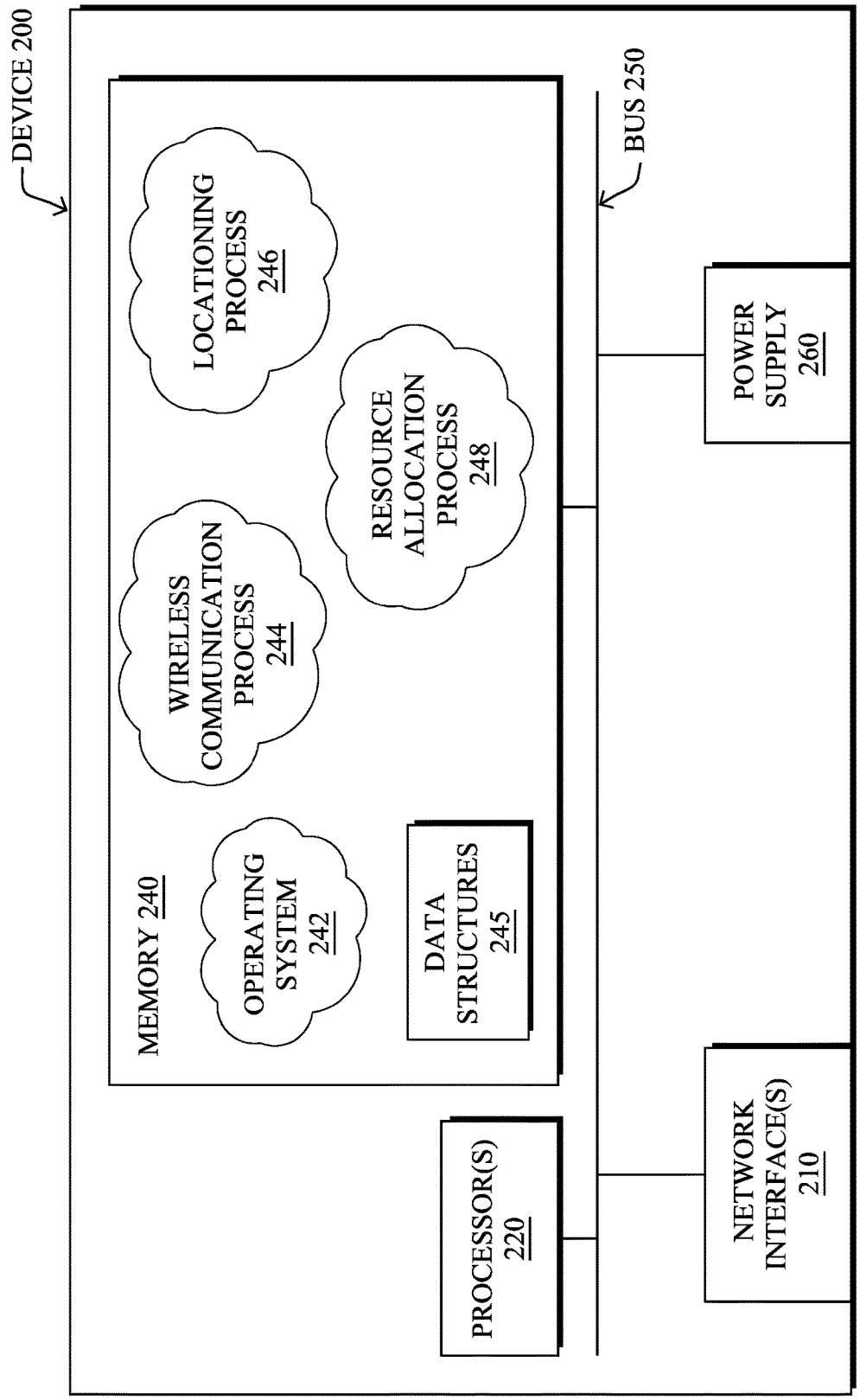
FIG. 2 illustrates an example network device/node.

FIG. 2 is a schematic block diagram of an example node/device 200 that may be used with one or more embodiments described herein, e.g., as any of the computing devices shown in FIG. 1, particularly the APs 110 or servers 145 to perform the functions described below, but also client nodes/device 120 for participation in the techniques accordingly. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processes and/or services may comprise (in addition to other functional processes) wireless communication process 244, and, illustratively, a locationing process 246 and a resource allocation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Wireless communication process 244 includes computer executable instructions executed by processor 220 to perform functions provided by one or more wireless communication protocols, such as 802.11a, b, g, n, 802.16, 802.20, 802.22, 3GPP LTE, and so on, as will be understood by those skilled in the art. These functions may be configured to allow communication between devices in a manner that allows the devices to "speak" and "listen" to each other on the same channels (radio frequency bands), at certain times, without colliding with other wireless signals between other devices, and so on. Certain wireless protocols, in particular, specifically address the utilization of available radio bandwidth, such as IEEE 802.11ax, where orthogonal frequency-division multiple access (OFDMA) is introduced to provide a multi-user version of the orthogonal frequency-division multiplexing (OFDM) digital modulation scheme (encoding digital data on multiple carrier frequencies). Multiple access is achieved in OFDMA by assigning subsets of subcarriers, called resource units (RUs), to individual users, allowing for simultaneous low-data-rate transmission from several users.

Specifically, when using OFDMA signaling as a centrally controlled medium access, the entire available signal/bandwidth is not used by a single client, but rather may be divided into RUs (e.g., "chunks" or "slices"), with specific sets of subcarriers assigned assigned to each client to use at any given time. Illustratively, OFDMA provides the dynamic assignment of a certain number (e.g., 26, 52, 106, 242, 484, or 996) of tones per station, where each tone consists of a single subcarrier of bandwidth (e.g., 78.125 kHz of bandwidth, thus the bandwidth occupied by a single OFDMA transmission is between approximately 2 MHz and 80 MHz bandwidth).

For example, OFDMA segregates the spectrum in time-frequency RUs, and a central coordinating entity (the AP in 802.11ax) assigns/allocates RUs for reception or transmission to associated stations to allow separation of the wireless communication and avoidance of collisions for simultaneous signals. In other words, through the central scheduling of the RUs contention overhead can be avoided, which increases efficiency in scenarios of dense deployments. Notably, certain clients may require more of the bandwidth than other client devices, and as such may be assigned to multiple RUs.

Figure 3:
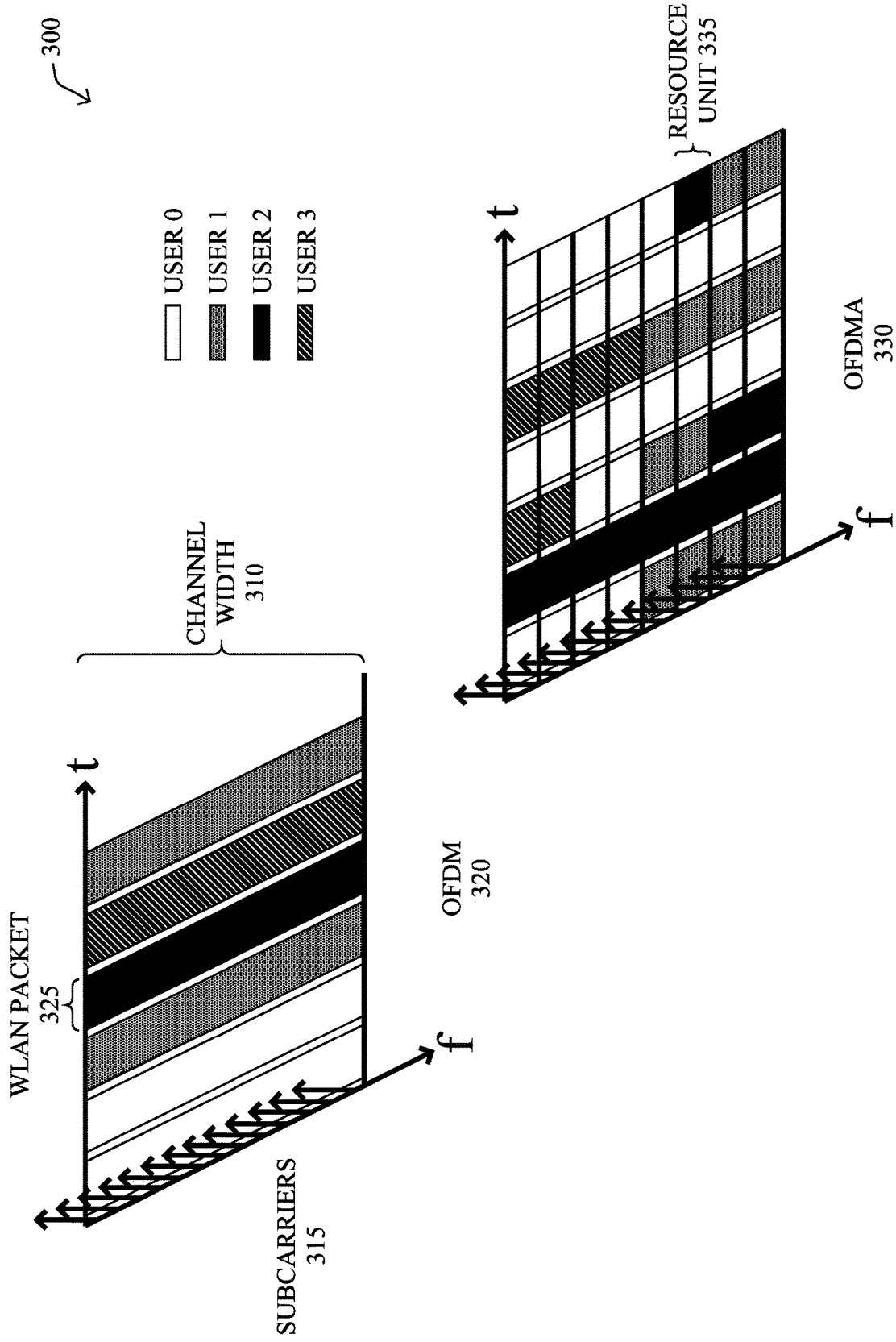
FIG. 3 illustrates an example of resource unit (RU) allocation in orthogonal frequency-division multiple access (OFDMA)

With reference to FIG. 3, for instance, based on multi-user traffic needs, a control device (e.g., an AP) decides how to allocate the subcarriers 315 of a channel 310, assigning all available RUs on the downlink. As shown in OFDM reference 320, it may allocate the whole channel to only one user (and one WLAN packet 325) at a time, or it may partition the channel into resource units 335 to serve multiple users simultaneously, as shown in OFDMA reference 330. Notably, current resource allocation (selecting and assigning RUs) is generally centered around data service performance, maximizing throughput, signal strengths, etc., measuring various factors and prioritizing RU assignments to particular client devices in order to achieve optimum performance within the wireless network.

Figure 4:
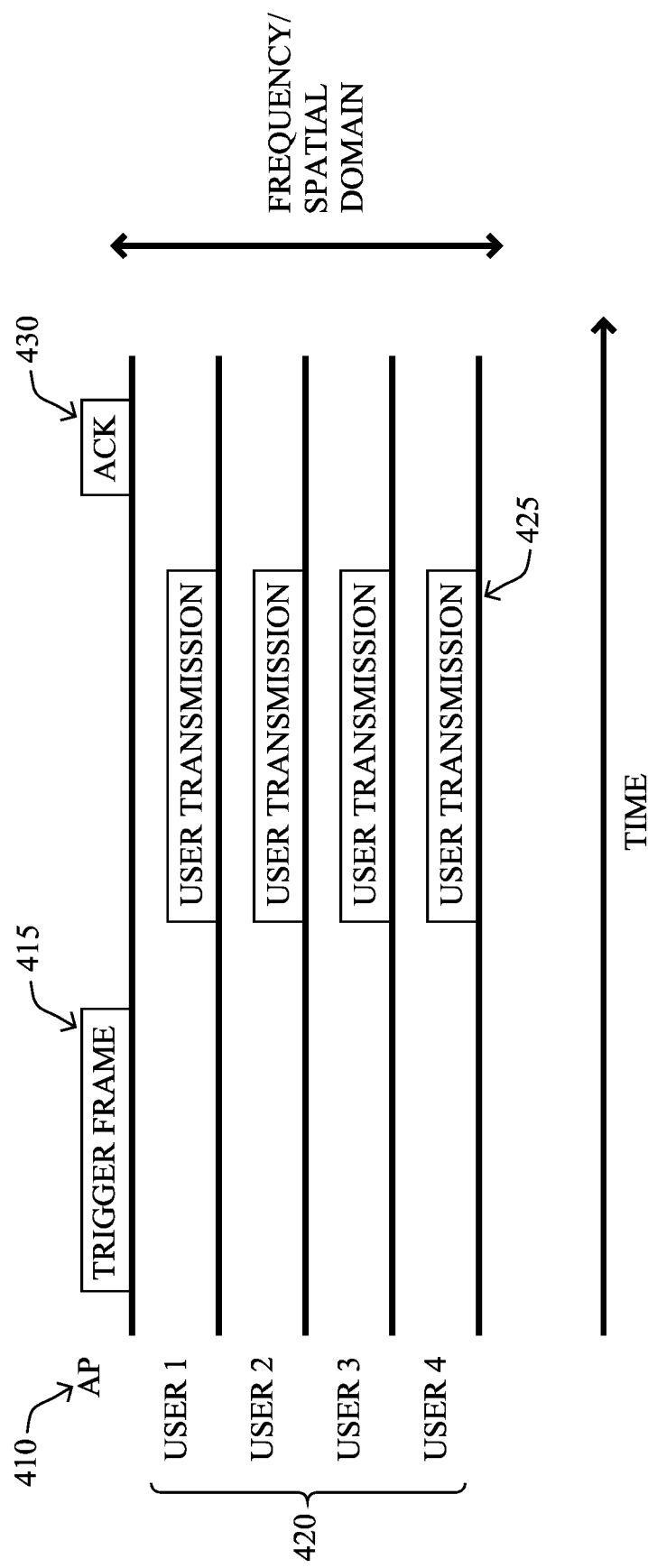
FIG. 4 illustrates an example of OFDMA-signaling-based communication.

With further reference to FIG. 4, in order to coordinate uplink OFDMA (or uplink MU-MIMO) transmissions, the AP 410 sends a trigger frame 415 to all client devices 420 ("user 1", "user 2", etc.). This frame indicates the OFDMA allocations (frequency and RU sizes) (and/or the number of spatial streams) of each user. (It may also contain power control information.) The AP also instructs all users when to start and stop transmitting. As FIG. 4, depicts, the AP sends a multi-user uplink trigger frame that indicates to all users the exact moment at which they all start transmitting (user transmissions 425), and the exact duration of their frame, to ensure that they all finish transmitting simultaneously as well. Once the AP receives the frames from all users, it sends them back a block ACK 430 to finish the operation.

—Location Accuracy in Resource Allocation for OFDMA—

Locationing systems, also referred to as positioning systems (or indoor positioning systems), use wireless signals to determine the location of client devices within a given area. In particular, using any number of known techniques based on measured wireless signal characteristics, such as angle of arrival (AoA), time of arrival (ToA), received signal strength indication (RSSI), and so on, correlation between multiple APs (e.g., triangulation) allows for general, or in some instances precise, location determination within a given space. For example, a locationing process 246 (e.g., on APs 110 or on a server 145 in communication with the APs) may receive low-level physical information from AP antenna arrays, and using an estimation of the phase of each of the antennas, can determine waveform/direction of a particular client device, where ToA and/or RSSI can be used to determine the estimated distance from the AP.

Generally, standard locationing techniques today utilize the entire bandwidth of the wireless communication channel (e.g., 20 MHz channels to 160 MHz channels) in order to achieve the best estimation of a device's location. Specifically, due to particular portions of the bandwidth behaving differently within a space based on variations, multipath reflections, and so on, using the entire bandwidth ensures the ability to discard or otherwise average the variations in the signals across the spectrum in order to achieve greater resolution for location.

The use of 802.11ax (particularly, OFDMA) offers an opportunity to scale locationing in the same way it can scale the number of clients served per frame. As mentioned above, however, locationing accuracy can suffer in OFDMA when narrower bandwidths are used (e.g., where resource units can be a 1/10th or even 1/80th of the full bandwidth of non-OFDMA), because narrow bandwidths are more susceptible to variations in the frequency selective channel, and simply selecting more resource units is not optimal as it reduces the capacity of the network. Accordingly, selection of the OFDMA resource unit allocation needs to be carefully selected in order to maintain location accuracy since certain RUs may lead to poorer location estimates.

The techniques herein, therefore, determine which particular RUs to assign to any AP-client pair in a manner that best preserves location accuracy. In particular, the techniques herein use one or more pieces of channel state information (CSI), such as RSSI per RU, dRSSI/dF (rate of change of RSSI as frequency changes), and correlation of each RU to the full bandwidth, in order to determine the best RU allocation per device to get the best location performance with respect to accuracy and scale.

Specifically, according to one or more embodiments of the disclosure as described in detail below, a control device associated with a wireless network of a given location determines a reference quality of location readings between access points and client devices based on using substantially all of an available wireless communication bandwidth. The control device may then determine channel state information (CSI) between the client devices and access points for each OFDMA RU, and selects a subset of RUs for allocation to each respective client device, based on the subset of RUs allocated to each respective client device i) surpassing a determined threshold of certain parameters of the CSI, while also ii) providing a minimum quality of a location reading based on using only the subset of RUs as compared to the reference quality of location readings. The control device may then allocate the selected subset of RUs to each respective client device for location-preserving OFDMA-signaling-based communication.

Illustratively, the techniques described herein may be performed by hardware, software, and/or firmware, such as in accordance with the resource allocation process 248, which may include computer executable instructions executed by the processor 220 to perform functions relating to the techniques described herein, e.g., in conjunction with one or more other devices (e.g., distributed collaboration between APs, servers, etc.).

Operationally, optimal resource unit allocation can be determined by looking at the channel state information (CSI) between client devices 120 (e.g., tags, phones, laptops, etc.) and each AP 110 (e.g., AP monitor radio) participating in location of wireless network 105. The CSI may be collected using various known techniques, typically through coordination between the client devices and APs. In particular, the CSI may be processed to determine the following information:

1. Average RSSI for each RU block (in general, it is more desirable to select RUs with a higher RSSI, since it leads to a higher signal-to-noise ratio (SNR) on the location estimate, and is more likely to contribute to an accurate estimate);
2. Average "dRSSI/dF" for each RU block, i.e., the absolute rate of change of the RSSI with respect to the change in frequency (that is, the derivative is taken to determine the slope of RSSI over frequency) (in general, it is more desirable to select RUs that have dRSSI/dF close to 0, since a rapidly changing RSSI over frequency suggests transitional points in the channel that have more variance); and
3. A proportion (e.g., percent) of RUs to which each RU is highly correlated, i.e., how much an RU is similar to other RUs, thus how much it represents the entire bandwidth (in general, it is more desirable to select RUs that are the most highly representative of the full-bandwidth-worth of RUs—that is, the ones with high correlation to more RUs).

The techniques herein may then use the CSI parameters above to determine which RUs to select for particular client devices. In particular, based on various thresholds for selection (e.g., by comparing the processed CSI to a database kept during training of the system), a subset of RUs of the available RUs may be allocated to each respective client device in such a way to ensure that the selected subset of RUs surpass the CSI-based thresholds (which is specific to the particular location of the wireless network 105 and dynamically changing). Notably, too, according to the techniques herein, the selected subset of RUs must also provide a minimum quality of a location reading based on using only that subset of RUs (as compared to a quality of location readings that would be available from using the entire bandwidth), as described below.

Illustratively, at each wireless network deployment, the thresholds for selection of RUs based on the above factors of similar RSSI or dRSSI/dF, or a correlation threshold related to the percentage of RUs, need to be tuned. As an example, in a high-ceiling environment such as warehouse (e.g., with a lot of multipath), the system herein may use a lower RSSI threshold for RU selection, while in an office environment (e.g., with limited multipaths) the RSSI threshold can be higher since fewer RUs would be needed to provide a sufficient location accuracy (e.g., similar to using the entire bandwidth), hence supporting more client measurements. Note further that in many cases, such as conference venues, these thresholds can vary over time, such as due to moving furniture, crowd formation, changes in temporary walls/divisions, and so on.

In accordance with an illustrative embodiment of the techniques herein, an online threshold learning algorithm may be used to determine the dynamic threshold for RU selection for a given deployment. Online machine learning, in particular, is a method of machine learning in which data becomes available sequentially (over time) and is used to update the best predictor for future data at each step (as opposed to batch learning techniques which generate the best predictor by learning on the entire training data set at once). Online machine learning can thus be used to dynamically adapt to new patterns in the data, or when the data itself is generated as a function of time.

As an example, the techniques herein propose using the known "winnow algorithm" to learn the thresholds, though notably any suitable machine learning algorithm may be used, accordingly. The winnow algorithm, in particular, is a technique from machine learning for learning a linear classifier from labeled examples. Winnow uses a multiplicative scheme, where during training the system is shown a sequence of positive and negative examples, from which it learns a decision "hyperplane" that can then be used to label new examples as positive or negative. As mentioned above, the winnow algorithm can also be used in the online learning setting, where the learning and the classification phase are not clearly separated.

The basic winnow algorithm, as will be understood by those skilled in the art, may be described as follows: The instance space is $X=\{0,1\}^n$, that is, each instance is described as a set of Boolean-valued features (true/false, 1/0, 1/−1, yes/no, etc.). The algorithm may maintain non-negative weights $w_i$ for $i \in \{1, \ldots, n\}$, which may be initially set to 1, one weight for each feature. When the learner is given an example $(x_1, \ldots, x_n)$, it applies the typical prediction rule for linear classifiers:

If $$\sum_{i=1}^{n} w_i x_i > \Theta,$$

then predict 1;

Otherwise predict 0.

Here $\Theta$ (theta) is a real number that is called the "threshold". Together with the weights, the threshold defines a dividing hyperplane in the instance space. During training, for each example with which it is presented, the learner determines whether the example is correctly classified (and does nothing), or else is predicted incorrectly, and then either demotes (if the correct result was 0) or promotes (if the correct result was 1) the weights for the corresponding feature, accordingly.

According to the techniques herein, therefore, the winnow algorithm (or other suitable threshold-based algorithm) can be used to determine the hyperplane (dividing line) between RUs that are good candidates for selection (i.e., surpass the thresholds) versus those that are not (i.e., do not surpass the thresholds).

Consider, for example, the following factors:
  x11 to be 1 if RSSI of RU is between 0-5 dBm of max RSSI of all RUs, and 0 otherwise;
  x12 to be 1 if RSSI of RU is between 5-10 dBm of max RSSI of all RUs, and 0 otherwise;
  x13 to be 1 if RSSI of RU is between 10-15 dBm of max RSSI of all RUs, and 0 otherwise;
  x14 to be 1 if RSSI of RU is between 15-20 dBm of max RSSI of all RUs, and 0 otherwise;
  x21 to be 1 if dRSSI/dF of RU is between 0-0.25 dB per MHz, and 0 otherwise;
  x22 to be 1 if dRSSI/dF of RU is between 0.25-3 dB per MHz, and 0 otherwise;
  x23 to be 1 if dRSSI/dF of RU is between 3-12 dB per MHz, and 0 otherwise;
  x24 to be 1 if dRSSI/dF of RU is between 12-100 dB per MHz, and 0 otherwise;
  x31 to be 1 if correlation of RU is between 0-0.5, and 0 otherwise;
  x32 to be 1 if correlation of RU is between 0.5-0.75, and 0 otherwise;
  x33 to be 1 if correlation of RU is between 0.75-0.9, and 0 otherwise; and
  x34 to be 1 if correlation of RU is between 0.9-1.0, and 0 otherwise.

According to the illustrative example, at the start of the algorithm the techniques herein consider all of the RUs (individually but all together, or else by using the entire bandwidth at once) in order to calculate the performance of the location reading. The quality of the location reading may be referred to herein as "Q" or the "reference quality", where Q can be based on one or more of the following:
  1. The confidence error of the location solution;
  2. The variance of the location solution over several measurements for a known stationary device (e.g., an AP or client device with gyro/accelerometer feedback); and/or
  3. A solution that has low error compared to a solution done by the full bandwidth of the channel, when that information is available.

By running the winnow algorithm, the techniques herein can update the rules to tune the thresholds, which in turn can then be used to select a subset of RUs that are suitable for each client device. Notably, the performance of location reading with only a subset of RUs is generally less than Q (based on all of the RUs/bandwidth). If the location reading from only the subset of RUs is referred to herein as $Q_p$, then a correct prediction is when $Q-Q_p<$delta (delta is the degree of accuracy desired). The threshold may thus be tuned to find the minimum number of RUs per client required for achieving the desired quality/performance of the location reading. (Note that the number of RUs for a given threshold can be added to the factor as a lambda variable, as may be appreciated by those skilled in the art.)

According to one or more embodiments herein, the algorithm above can be periodically run in order to retune the threshold and adapt for any dynamic changes in the environment.

Figure 5:
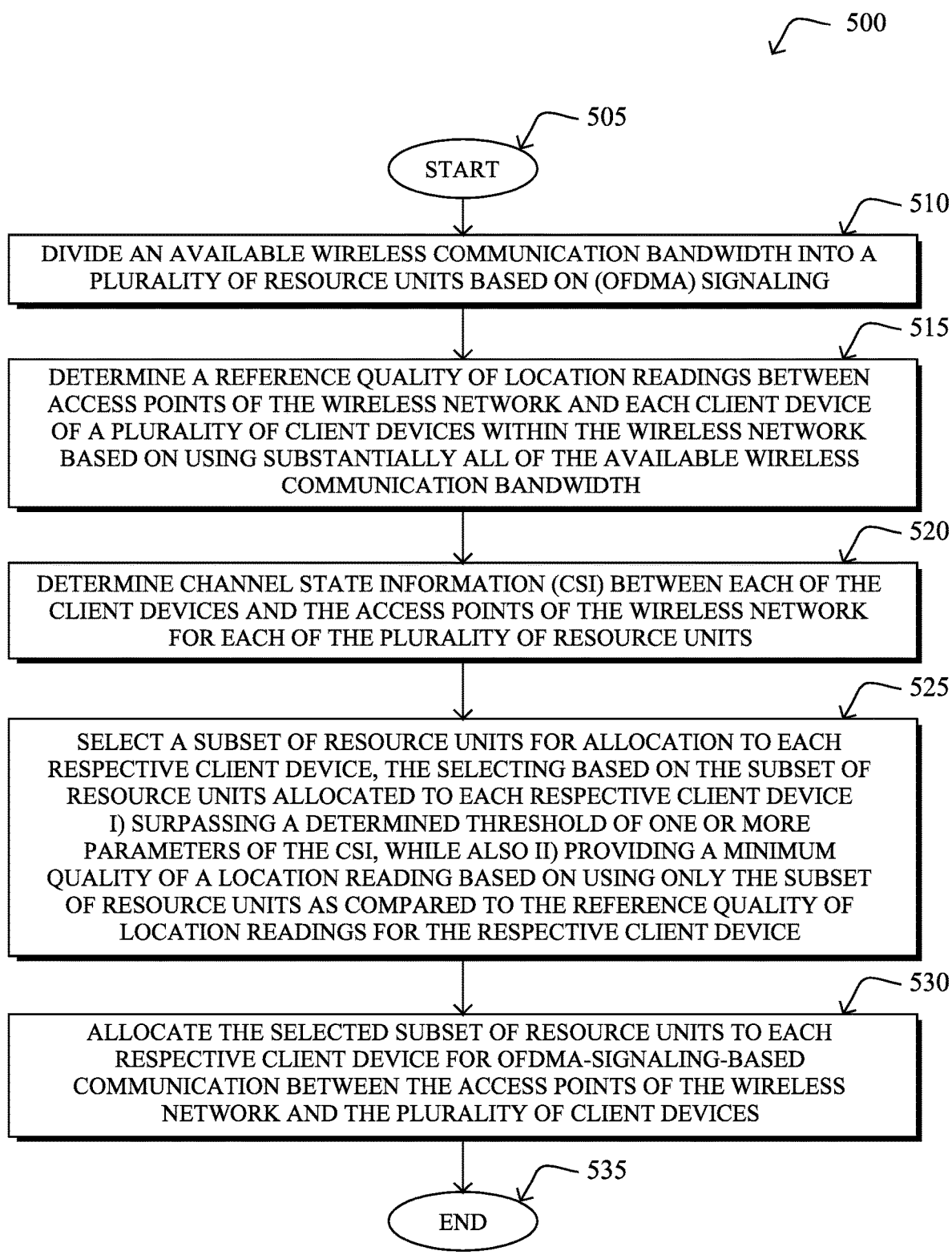
FIG. 5 illustrates an example simplified procedure for resource allocation for OFDMA with preservation of wireless location accuracy.

FIG. 5 illustrates an example simplified procedure for resource allocation for OFDMA with preservation of wireless location accuracy in a network in accordance with one or more embodiments described herein. For example, a non-generic, specifically configured "control device" associated with a wireless network 105 of a given location (e.g., device 200, such as an AP, server, etc.) may perform procedure 500 by executing stored instructions (e.g., process 248). The procedure 500 may start at step 505, and continues to step 410, where, as described in greater detail above, the control device divides an available wireless communication bandwidth into a plurality of resource units (RUs) 335 based on OFDMA signaling, as will be understood by those skilled in the art.

In step 515, the control device determines a reference quality (Q) of location readings between one or more access points 110 of the wireless network 105 and each of a plurality of client devices 120 within the wireless network based on using substantially all of the available wireless communication bandwidth 310. As mentioned above, determining the reference quality of location readings may be based on using a full bandwidth of a channel 310 (i.e., irrespective of the plurality of RUs), or else based on using all of the plurality of RUs 335 individually, and correlating the results. The reference quality may thus be based on factors such as a confidence error, a variance over several measurements for a stationary device (with a known location), location readings with low error as compared to a known location readings (e.g., based on using a full bandwidth of a channel irrespective of the plurality of RUs), as described above.

In step 520, the control device may also determine the channel state information (CSI) between each of the plurality of client devices 120 and the one or more access points 110 of the wireless network 105 for each of the plurality of RUs 335. In particular, as described above, the CSI may be processed in order to specifically determine parameters of the CSI, such as an average RSSI for each RU, an average of an absolute rate of change of RSSI with respect to change in frequency (dRSSI/dF) for each RU, a proportion of the plurality of RUs to which each RU is correlated, and so on.

According to the techniques herein, the control device may now, in step 525, select a subset of RUs of the plurality of RUs for allocation to each respective client device of the plurality of client devices. As described above, the selecting may specifically be based on the subset of RUs that are allocated to each respective client device meeting both of the following conditions:
  i) surpassing a determined threshold of one or more parameters of the CSI, while also:
  ii) providing a minimum quality of a location reading based on using only the subset of RUs as compared to the reference quality of location readings for the respective client device.

As described above, selecting the subset of RUs in step 525 based on surpassing the determined CSI-based threshold(s) corresponds to one or more of:
  i) having an average RSSI surpassing above a certain RSSI threshold;
  ii) having a dRSSI/dF surpassing below a certain slope threshold; and
  iii) having a proportion of the plurality of RUs to which a particular RU is correlated surpassing above a certain correlation threshold.

These thresholds, in particular, may be adjusted through machine learning to determine a minimum number of RUs to allocate to each respective client device (e.g., an online threshold learning algorithm, such as the winnow algorithm as mentioned above), that is, the minimum number of RUs that still preserves wireless location accuracy.

Accordingly, in step 530, the control device may then allocate the selected subset of RUs of the plurality of RUs to each respective client device of the plurality of client devices for OFDMA-signaling-based communication between the one or more access points of the wireless network and the plurality of client devices. The simplified procedure 500 may then end in step 535, notably, with the option to continue "re-adjusting" the determined threshold(s) of the one or more parameters of the CSI over time, as mentioned above.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for resource allocation for OFDMA with preservation of wireless location accuracy. That is, the techniques herein optimize allocation of RUs in OFDMA in a manner that still allows accurate wireless locationing of client devices based on the CSI from one or more APs in the given physical area. In particular, since the CSI can be used to detect wireless radio signal effects of the environment, such as blockages, reflections, absorptions, etc., the techniques herein facilitate selection of the RUs that provide the "best direct path" in order to provide maximized location accuracy, thus resulting in improved locationing based on the chosen OFDMA RU signals. Furthermore, the techniques herein use snapshots of the CSI in time (simultaneous samplings), and thus adapt to changes in the environment at any particular instant, where, notably, the selection of RUs is based on training specific to the variations of the particular environment.

Said differently, the techniques described above preserve location accuracy by finding groups of clients with complimentary RUs in which each client's set of RUs best represents the channel that yields low-level location metrics across multiple APs similar to those of that client's full bandwidth channel. The techniques may then allow scheduling those clients together with 802.11ax trigger frames with their "location-accuracy-optimized" RUs allocated (that is, based on the preservation of wireless location accuracy).

The problem faced in OFDMA is that it is moving toward narrow band communication, and though it can be straightforward to find a narrow band RU that maximizes SNR for a single AP or to find the allocation that maximizes capacity, finding an RU or a combination of RUs across multiple APs to preserve location accuracy is a difficult problem that the techniques herein aim to solve. In particular, the techniques herein look to find RUs/AP combos that maintain high correlation to the location results obtained with the full bandwidth for any given client. For instance, there are some RUs that produce an AoA, ToA, or RSSI result that is very similar to the full bandwidth and other RUs that will produce drastically different results due to channel variation. The techniques herein thus attempt to find the best RU or combination of RUs to get as close the result that would be achieved if the full bandwidth were used. (Notably, many current techniques are uninterested in how similar the channel is between a narrow slice of spectrum and the full bandwidth, or how fast the channel is changing over frequency, but instead are merely interested in allocating RUs to maximize SNR.)

While there have been shown and described illustrative embodiments that provide for location accuracy in resource allocation for OFDMA, it is to be understood that various other adaptations and modifications may be made within the spirit and scope of the embodiments herein. For example, while certain embodiments are described herein with respect to certain protocols, such as 802.11ax, other suitable protocols may be used, accordingly. In fact, though OFDMA is used as the primary example of a wireless transmission protocol with divided frequency bands, any suitable technology with resource units (frequency bands) may benefit from the techniques described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    dividing, by a control device associated with a wireless network of a given location, an available wireless communication bandwidth into a plurality of resource units (RUs) based on orthogonal frequency-division multiple access (OFDMA) signaling;
    determining, by the control device, a reference quality of location readings between one or more access points of the wireless network and each of a plurality of client devices within the wireless network based on using substantially all of the available wireless communication bandwidth;
    determining, by the control device, channel state information (CSI) between each of the plurality of client devices and the one or more access points of the wireless network for each of the plurality of RUs;
    selecting, by the control device, a subset of RUs of the plurality of RUs for allocation to each respective client device of the plurality of client devices, wherein the selected subset of RUs allocated to each respective client device i) surpasses a determined threshold of one or more parameters of the CSI, while also ii) provides a minimum quality of a location reading based on using only the subset of RUs as compared to the reference quality of location readings for the respective client device; and
    allocating, by the control device, the selected subset of RUs of the plurality of RUs to each respective client device of the plurality of client devices for OFDMA-signaling-based communication between the one or more access points of the wireless network and the plurality of client devices.

2. The method as in claim 1, further comprising:
    adjusting the determined threshold of the one or more parameters of the CSI through machine learning to determine a minimum number of RUs to allocate to each respective client device.

3. The method as in claim 2, wherein the machine learning comprises an online threshold learning algorithm.

4. The method as in claim 3, wherein the online threshold learning algorithm comprises a winnow algorithm.

5. The method as in claim 1, further comprising:
    re-adjusting the determined threshold of the one or more parameters of the CSI over time.

6. The method as in claim 1, wherein determining the reference quality of location readings based on using substantially all of the available wireless communication bandwidth is based on using all of the plurality of RUs.

7. The method as in claim 6, wherein the reference quality is based on one or more factors selected from a group consisting of:
    a confidence error of the location readings;
    variance of the location readings over several measurements for a stationary device with a known location; and
    a location reading with a low error as compared to a known location reading based on using a full bandwidth of a channel irrespective of the plurality of RUs.

8. The method as in claim 1, wherein determining the reference quality of location readings based on using substantially all of the available wireless communication bandwidth is based on using a full bandwidth of a channel irrespective of the plurality of RUs.

9. The method as in claim 1, further comprising:
    processing the CSI to determine the one or more parameters of the CSI, the one or more parameters selected from a group consisting of:
        an average received signal strength indication (RSSI) for each RU;
        an average of an absolute rate of change of RSSI with respect to change in frequency (dRSSI/dF) for each RU; and
        a proportion of the plurality of RUs to which each RU is correlated.

10. The method as in claim 9, wherein selecting the subset of RUs based on surpassing the determined threshold of one or more parameters of the CSI corresponds to one or more of:
    i) having an average RSSI surpassing above a certain RSSI threshold;
    ii) having a dRSSI/dF surpassing below a certain slope threshold; and
    iii) having a proportion of the plurality of RUs to which a particular RU is correlated surpassing above a certain correlation threshold.

11. A tangible, non-transitory, computer-readable medium storing program instructions that cause a computer to execute a process, comprising:
    dividing, within a wireless network of a given location, an available wireless communication bandwidth into a plurality of resource units (RUs) based on orthogonal frequency-division multiple access (OFDMA) signaling;
    determining a reference quality of location readings between one or more access points of the wireless network and each of a plurality of client devices within the wireless network based on using substantially all of the available wireless communication bandwidth;
    determining channel state information (CSI) between each of the plurality of client devices and the one or more access points of the wireless network for each of the plurality of RUs;
    selecting a subset of RUs of the plurality of RUs for allocation to each respective client device of the plurality of client devices, wherein the selected subset of RUs allocated to each respective client device i) surpasses a determined threshold of one or more parameters of the CSI, while also ii) provides a minimum quality of a location reading based on using only the subset of RUs as compared to the reference quality of location readings for the respective client device; and allocating the selected subset of RUs of the plurality of RUs to each respective client device of the plurality of client devices for OFDMA-signaling-based communication between the one or more access points of the wireless network and the plurality of client devices.

12. The computer-readable medium as in claim 11, wherein the process further comprises:
adjusting the determined threshold of the one or more parameters of the CSI through machine learning to determine a minimum number of RUs to allocate to each respective client device.

13. The computer-readable medium as in claim 11, wherein the process further comprises:
re-adjusting the determined threshold of the one or more parameters of the CSI over time.

14. The computer-readable medium as in claim 11, wherein determining the reference quality of location readings based on using substantially all of the available wireless communication bandwidth is based on using all of the plurality of RUs.

15. The computer-readable medium as in claim 11, wherein determining the reference quality of location readings based on using substantially all of the available wireless communication bandwidth is based on using a full bandwidth of a channel irrespective of the plurality of RUs.

16. The computer-readable medium as in claim 11, wherein the process further comprises:
processing the CSI to determine the one or more parameters of the CSI, the one or more parameters selected from a group consisting of:
an average received signal strength indication (RSSI) for each RU;
an average of an absolute rate of change of RSSI with respect to change in frequency (dRSSI/dF) for each RU; and
a proportion of the plurality of RUs to which each RU is correlated.

17. The computer-readable medium as in claim 11, wherein selecting the subset of RUs based on surpassing the determined threshold of one or more parameters of the CSI corresponds to one or more of:
i) having an average RSSI surpassing above a certain RSSI threshold;
ii) having a dRSSI/dF surpassing below a certain slope threshold; and
iii) having a proportion of the plurality of RUs to which a particular RU is correlated surpassing above a certain correlation threshold.

18. An apparatus, comprising:
one or more network interfaces to communicate with a wireless network of a given location;
a processor coupled to the network interfaces and configured to execute one or more process; and
a memory configured to store a process executable by the processor, the process when executed configured to:
divide an available wireless communication bandwidth into a plurality of resource units (RUs) based on orthogonal frequency-division multiple access (OFDMA) signaling;
determine a reference quality of location readings between one or more access points of the wireless network and each of a plurality of client devices within the wireless network based on using substantially all of the available wireless communication bandwidth;
determine channel state information (CSI) between each of the plurality of client devices and the one or more access points of the wireless network for each of the plurality of RUs;
select a subset of RUs of the plurality of RUs for allocation to each respective client device of the plurality of client devices, wherein the selected subset of RUs allocated to each respective client device i) surpasses a determined threshold of one or more parameters of the CSI, while also ii) provides a minimum quality of a location reading based on using only the subset of RUs as compared to the reference quality of location readings for the respective client device; and
allocate the selected subset of RUs of the plurality of RUs to each respective client device of the plurality of client devices for OFDMA-signaling-based communication between the one or more access points of the wireless network and the plurality of client devices.

19. The apparatus as in claim 18, wherein the process when executed is further configured to:
adjust the determined threshold of the one or more parameters of the CSI through machine learning to determine a minimum number of RUs to allocate to each respective client device.

20. The apparatus as in claim 18, wherein the process when executed is further configured to:
process the CSI to determine the one or more parameters of the CSI, the one or more parameters selected from a group consisting of:
an average received signal strength indication (RSSI) for each RU;
an average of an absolute rate of change of RSSI with respect to change in frequency (dRSSI/dF) for each RU; and
a proportion of the plurality of RUs to which each RU is correlated.

* * * * *